United States Patent [19]

Goldberg et al.

[11] 4,226,926

[45] Oct. 7, 1980

[54] FLEXIBLE, MICROPOROUS RUBBER BASE ARTICLES

[75] Inventors: Bruce S. Goldberg, Clifton; Mahendra Shah, Newark, both of N.J.

[73] Assignee: Amerace Corporation, New York, N.Y.

[21] Appl. No.: 915,915

[22] Filed: Jun. 16, 1978

[51] Int. Cl.³ .......................... H01M 2/16; C08J 9/28
[52] U.S. Cl. ..................................... 429/252; 429/254; 204/159.15; 521/62; 525/305
[58] Field of Search .............. 429/254, 252; 260/472; 521/62–65; 525/305; 204/159.15, 159.16, 159.17

[56] References Cited

U.S. PATENT DOCUMENTS

| | | | |
|---|---|---|---|
| 3,351,495 | 11/1967 | Larsen et al. | 429/252 |
| 3,383,248 | 5/1968 | Badgley et al. | 429/254 X |
| 3,615,865 | 10/1971 | Wetherell | 429/254 |
| 3,956,020 | 5/1976 | Weininger et al. | 429/254 |
| 4,024,323 | 5/1977 | Versteegh | 429/254 |
| 4,049,757 | 9/1977 | Kammel et al. | 204/159.17 |

Primary Examiner—Anthony Skapars
Attorney, Agent, or Firm—S. Michael Bender; Fred A. Keire

[57] ABSTRACT

As an article of manufacture, a microporous flexible shape or sheet of a sulfur-free, cured polymeric material of a curable rubber, an ethylene-propylene copolymer or mixtures of the curable rubber and ethylene-propylene copolymer; the article possesses an average pore size of less than 2 microns, a predetermined flexibility, and improved toughness, when compared to prior art sulfur cured articles.

32 Claims, No Drawings

FLEXIBLE, MICROPOROUS RUBBER BASE ARTICLES

This invention pertains to microporous articles made of polymeric materials; more particularly, this invention pertains to cured polymeric compositions wherein the average pore size is less than 2 and, more commonly, less than 1 micron and wherein the article can be tailor-made to be of varying degrees of flexibility ranging from completely drapable material to a relatively stiff material, yet non-brittle and tough having flexibility and toughness characteristics heretofore unknown in sulfur cured materials. A microporous sheet backed with a non-woven web is also disclosed having a number of properties heretofore unknown such as elongation greater than 25%, tensile strength up to 1000 psi, and above, etc.

BACKGROUND OF THE INVENTION

In commonly used electric storage batteries, such as the well known 12-volt battery employed in cars, it has been a desiratum to have a battery separator between the battery plates as thin as is possible to obtain so as to have the lowest possible electrical resistance. At the same time, it has been sought to obtain a battery separator which is reasonably flexible and yet does not develop failure in use such as brittle failure.

Generally, a battery separator is needed as a spacer to prevent two plates from touching each other causing a short. At the same time, a separator shall not impede the electrolyte flow. Also, a fine pore size is desirable to prevent dendrite growth developing between adjacent plates. The result of dendrite growth is a battery "short". For one or more of the reasons given above, it has been necessary not only to increase the battery plate spacing, but also to use battery separators.

Various other problems have also resulted from spalling of the battery plates associated with the use of antimony or calcium additives to the lead plates. Spalled deposits at the bottom of the battery have likewise caused shorts or premature failure of the battery. For this reason, it has been sought to have a battery which could be made in a manner whereby the battery separators could be festooned around the plates or made in a serpentine fashion thereby isolating one plate from the other.

However, the prior art battery separators have been invariably rather stiff and inflexible; complex shapes could only be formed with great difficulty. In addition to the above problems, overvoltage caused at the electrodes, particularly at an anode, has required the well known addition of battery water.

Only recently the overvoltage problem has been solved to a point such that maintenance-free batteries can be used with any degree of satisfaction. In no small part this has been a result of better plate or electrode materials or battery separators.

In the art of producing battery separators, commonly as a cheap and fairly short-lived separator, paper webs have been used. However, these possess disadvantages and instead of paper, better quality batteries have, as separators, cured natural rubber compositions. A common disadvantage inherent in the use of rubber or natural rubber based battery separators is that a sulfur cure process not only is capital intensive, being a batch process, but it is also labor and energy intensive. Sulfur curing of natural rubber microporous articles results in stiff and brittle products. Moreover, in order to maintain the porosity provided by rehydrated silica, a battery separator must be sulfur cured in a water filled autoclave. Repeated raising and lowering of temperature of large amounts of water is very energy consuming.

In the curing of the rubber compositions, the cured articles are tested for cracking and brittleness. Unless very careful processing steps are followed in making sulfur cured separators, problems of brittle cracking often result. Dimensional tolerances are also difficult to maintain, for example, cured sheets from which battery separators are made require grinding.

BRIEF DESCRIPTION OF PRIOR ART

As a partial solution to the above problems associated with sulfur cured rubber products, phenolformaldehyde resin impregnated webs have been used as battery separators. The polyphenol resin is generally cured to a B stage and produces a stiff battery separator. As another approach to solving the prior art problems, a polyvinyl chloride (PVC) impregnated web has been proposed as a battery separator. However, production of these impregnated webs requires using solvent systems and solvent removal as well as contribute to unwanted disposal and contamination problems.

A PVC web also must be heat-embossed or hot-embossed to produce the necessary ribbing for allowing electrolyte flow and necessary strength.

As another battery separator, a melt blown polypropylene mat has been proposed. However, the pore size of the mat has been excessive and unacceptable and electrical resistance characteristics have been hard to control.

These prior art efforts have required entirely new machinery and new processing techniques obsoleting existing facilities.

A number of microporous articles and techniques for producing these permeable, microporous products have been disclosed, such as in U.S. Pat. Nos. 2,274,260, 2,329,322, 2,336,754, 2,686,142, 2,637,876, 3,298,869, 3,450,650, 3,773,540, 3,890,184, 3,900,341, and Canadian Pat. No. 1,020,184 and references mentioned in these patents and further amplify the above description.

BRIEF DESCRIPTION OF THE INVENTION

It has now been found that the microporous sheet material of predeterminable, tailor-made flexibility, improved toughness, and elongation can be produced with assured microporosity and other properties which are better than the best heretofore known sulfur-cured rubber microporous article. A far-and-away greater flexibility of the new article has been accomplished without a sacrifice of the other properties or performance of the article in use, such as a battery separator. The discovered material ranges from flexible drapable sheets to stiff, tough, yet non-brittle boards. Hence, as one aspect of the invention, a battery separator has been disclosed which can now be readily shaped to any desired contour, can be made of various thicknesses, and can also be used in combination with a backing material. The newly discovered microporous material can be employed as microporous fibers, enzyme carriers, diffusers, fabric materials, and possesses numerous advantages which will be further explained herein.

As another aspect of the invention, a battery separator has been disclosed with a backing of heretofore unknown character possessing properties in combination such as low electrical resistance, reduced amount of microporous material (in combination with the backing), and improved tensile, tear, toughness, elongation, and resistance to distortion. A superior combination has been discovered which is a synergistically coacting combination of the newly discovered microporous rubber base material and the flexible backing material.

Still further, a composition of matter suitable for producing these microporous articles has been disclosed. It is a curable composition. This curable composition has been found to be especially suitable for electron beam curing. Moreover, the composition displays the superior properties when used with curatives heretofore unknown for that purpose, but curatives which are especially efficacious when subjected to electron beam irradiation. Synergistically coating polymeric compositions, each with the other, and with the curative(s) therefor, have reduced the irradiation levels to heretofore unknown levels. Whereas typically for a cure, the prior art has suggested an irradiation dose for non-analogous products and heavily sensitized compositions of curable natural rubber from 20 to 40 megarads of styrene-butadiene or nitrile-butadiene rubber from 14 to 15 megarads and EPDM (ethylene-propylene-diene) copolymer from 12 to 14 megarads, the present microporous precursor composition is effectively curable at an irradiation level less than 6 megarads, preferably at about 3 to 4 megarads. Although curing at higher levels is possible, e.g., at 6 megarads and up, including up to 10, a number of properties suffer, such as flexibility; hence, for economic and best product performance, irradiation is to be carried out at a dose rate of less than 6. A reduction in irradiation of such magnitude should be readily appreciated in an industrial environment.

In accordance with the present invention, the precursor, noncured compositions, as well as the cured compositions are believed to be novel compositions of matter.

The precise description of these compositions will be given below. In general terms, the curable composition consists of a curable rubber, e.g., natural rubber, polyisoprene, and various variants thereof, styrene-butadiene rubber, nitrilebutadiene rubber, or mixtures thereof; these may be used by themselves, but with considerably greater advantage when used in combination with ethylene-propylene monomer (the last can also be used as the curable composition by itself) and as a curative for the above, a polyol diacrylate, a polyol triacrylate, a polyol tetraacrylate, a polyol dimethacrylate, a polyoltrimethacrylate, a polyol tetramethacrylate, or mixtures thereof. An illustrative, advantageous curative is trimethylol propane trimethacrylate. It is postulated that upon curing, the curative contributes significantly to the end product performance.

The process for producing of these materials in a continuous manner, in distinction from the prior art batch processing, has been disclosed in a companion application filed on even date herewith Ser. No. 915917 and constitutes a separation invention.

DETAILED DESCRIPTION OF THE INVENTION AND EMBODIMENTS THEREOF

In the essential aspect, the process for producing the curable composition, the microporous material or any shape, e.g., a sheet, is best described by the following general example.

GENERAL EXAMPLE

A. Rehydration of Silica

The moisture content of the silica is determined first and then a correction is allowed for it before rehydration. Rehydration levels of 66.5% or 69.0% are typically employed but can range from 65 to 70%. One thousand grams (1000 g) of silica are introduced into a blender and the corrected amount of water is pumped in at a rate of 800 to 900 cc/min. The pumping time of water should be fairly short of the order of few minutes as otherwise the blend gets too wet. After finishing the rehydration cycle, the blend is discharged and its moisture preserved. The blend should be in a powdered, friable form.

B. Masterbatch Procedure

The masterbatch preparation is desirable for obtaining a uniform mix of the curable composition, in this example, ethylene-propylene copolymer (EPM) and/or natural rubber. Accordingly, the masterbatch consists of natural rubber, EPM, UV stabilizer, and carbon black. A required amount of EPM and natural rubber grind (about 1000 g as an illustration) are placed into a Banbury mixer and mixed for about 3-4 min. (at the second gear speed) until the temperature rises to 250° F. Then the UV stabilizer and/or carbon black (acting also as a UV stabilizer) are (is) added and the batch is dropped (discharged) at 275° F. Total time is about 5 min. During this operation, a small amount of warm water (at about 150° F.) is going through the rotors and body of the Banbury mixer to provide for temperature control. The total time required to make the masterbatch should be about 5 minutes. The masterbatch coming out of the Banbury mixer is placed on the two-roll mill (cold) and is sheeted out.

C. Compounding Procedure

A required amount of masterbatch (250-300 g) is milled on the two-roll cold mill until it became smooth (5 mins.) and then placed in the Banbury mixer with diphenyl guanidine (DPG)—as a mixing aid. The Banbury body temperature is 140° F. with no heat or cooling water circulated to the rotor. The Banbury mixing speed is at its "slow" speed and when the temperature reaches 150° F., one-half of the required amount of rehydrated silica and a curvative, e.g., trimethylol propane trimethacrylate (TMPTM) are added. The composition is mixed until it again reaches 150° F. and then the rest of the rehydrated silica is added and is allowed to mix until it again reaches 150°-160° F. The composition is then dropped. A very uniform mix is obtained and the total Banbury mixing time is about 8 minutes. Thereafter on a two-roll mill, this mixture is milled for about 7 to 8 minutes. Both mill roll temperatures are 140° F. The milled sheet is cut into small pieces and soaked in hot water for 30 to 45 seconds at 50°-85° C. and is then calandered for contours and/or optionally a backing added thereto such as paper or heat-bonded polyester mat. (The last is vastly more preferred as will be explained herein.) The temperature of both calander rolls is 130° F. The calandered sheet is cut into appropriate pieces, such as 15"×9" pieces, and is irradiated in an electron beam (EB) unit. After EB curing, these sheets are then dried at about 50° to 80° C. to achieve the desired porosity.

In a continuous operation instead as indicated above, after milling the composition, it is then introduced into an extruder wherefrom a shape obtained from the extruder is immersed into a water bath at a temperature of 80° C. to 85° C. so as to maintain, if necessary, the water of hydration associated with silica. From this water bath, the extruded shape travels through a forming roll such as to produce a sheet of the desired surface characteristics, for example, with ribs or other protuberances.

An extruded sheet of the polymer, i.e., rubber or rubber and/or ethylene-propylene copolymer mixture may in the forming step be suitably backed (should a backing be desired). From the forming roll, the sheet is again introduced into a water bath which is at a temperature of 25° to 85° F., and then into an electron beam irradiation unit wherein the sheet is irradiated at a dose rate desirably 4 megarads or less. Irradiation at higher energy levels than 6 megarads, and sometimes even at that level, causes the composition to become unduly embrittled. From the irradiation unit, the continuously moving sheet travels to a dryer where the water or hydration associated with silica is being removed obtaining thereby the desired pore size and porosity. From there, the sheet travels to the finishing operations where it is being slit, cut, and packaged in appropriate containers for shipping to battery manufacturers.

The description of the various components for the precursor composition is given below to illustrate the scope of the invention as well as to provide further elaboration on the embodiment discussed above.

As starting material, natural rubber is No. 1 smoked sheet possessing Mooney viscosities of about 25° to 30° at 175° F. On basis of plasticity, the natural rubber should be between 14 to 18 (rheometer-50 scan). In place of natural rubber, synthetic polyisoprene, the various stereo specific variants and polymers thereof are also within the contemplation of the present invention as are mixtures of same with natural rubber.

Another polymer useful in the present process for the disclosed purposes is styrene-butadiene rubber (SBR), nitrilebutadiene rubber (NBR), or mixtures of the above. It is, of course, to be understood that before curing, SBR and NBR are polymers which are not thermoset. All of the above polymers may be used in admixture with each other.

As a coacting component, to impart the toughness, flexibility, and other desirable characteristics to the curable rubber, e.g., natural rubber, ethylene propylene copolymers unexpectedly have provided, in the combination with rubber or even by themselves, a number of highly beneficial properties. Although in the prior art, ethylene propylene copolymers are often either designated as ethylene propylene polymer or ethylene propylene monomer or ethylene propylene rubber, the more accurate description is a "copolymer consisting of ethylene and propylene" in various portions typically ranging from 20% to 80% ethylene, balance propylene.

A particularly desirable combination of the ethylene propylene copolymer has been found to be one which has ethylene content of about 60% by weight in the copolymer, the polymer having a Mooney viscosity of about 30. This product is commercially available and known as EPCAR 306 and available from B.F. Goodrich & Co. Although other EPDM terpolymers have been investigated, the preferred polymer is the ethylene propylene copolymer.

The curative for the above composition, either for the rubber, e.g., natural rubber or the ethylene polymer copolymer or mixtures thereof typically is an acrylate or a methacrylate of a polyol. The polyol may be a di, tri, or tetra functional polyol, the acrylate or methacrylate being formed with the hydroxyl groups of the polyol. The polyol may have from 3 up to 10 carbon atoms. Illustrative polyols from which the acrylates and methacrylates are formed are tirmethylol propane, pentaerythritol, triethylene glycol, 1,6 hexane diol, etc. Mixtures of the acrylates and/or methacrylates of the above polyols are also included as curatives. Trimethylol propane trimethacrylate (TMPTM) has been found to be the species most suitable for the present purposes. Of the methacrylate or acrylate species, the methacrylate is preferred because of the vastly lesser problems of toxicity vis-a-vis the acrylate.

In the combination, typically the curative used is from 0.5 to 3 parts per weight per 100 parts of the curable rubber, ethylene propylene copolymer, or the mixtures of same.

A more flexible product is obtained when rubber such as natural rubber is being used as the predominant or major component of the polymer in the composition up to and including 100% of the curable material. However, greater rigidity and stiffness is obtained when ethylene propylene copolymer is used in amounts from 35% to 20%, stiffness still being contributed to the combination when the amounts are as low as 5 to 3%. Appropriate microporous articles have been obtained solely from the curable rubber, e.g., natural rubber or solely from ethylene propylene copolymer cured with the above curative.

It has been found, however, that for certain articles of manufacture, such as battery separators, the amount of ethylene propylene copolymer in the mixture is desirably in the range from about 35 to 15%, most desirably, at about 20%. However, ratios of natural rubber to ethylene propylene to polymer such as of 70/10, 80/20, 75/25, 70/30, 60/40, 50/50, and up to 100 parts of ethylene propylene rubber have been evaluated. Various proportions of these components give various properties and thus allow to obtain the tailor-made characteristics.

In addition to the above, carbon black is being used as an additive which improves the stability (as a UV stabilizer) of the porous article by itself or in combination with an antioxidant (UV stabilizer).

Typically, carbon black is used from 0.5 to 3 parts per hundred (pph) of the polymer; and the stabilizer from 0.5 to 2 pph.

Of the various stabilizers, a butylated p-cresol dicyclopentadiene was found to be preferred. It is available as Wingstay-L from The Goodyear Tire & Rubber Co. Other stabilizers are such as styrenated diphenylamine, Wingstay 29 also available from The Goodyear Tire & Rubber Co. and polymerized 1,2 dihydro-2,2,4 trimethyl quinoline (FlectoAge from Monsanto Co.).

The silica powder is for introducing the porosity in the polymer. It is readily obtainable. One type is Hi-Sil 233 available from Pittsburgh Plate Glass Co. Generally, the surface area for silica should be greater than 50 $m^2/gr$ (B.E.T. procedure) and minimum oil absorption should be about 100 cc of oil or more per 100 gr of silica (ASTM method D-281-31).

The amount of silica being used is in proportions of rehydrated silica to rubber of 3.0:1 to 8:1, by weight, preferably 3.5:1 to 5.5:1 by weight at a silica rehydration level of about 65 to 70% and up to 75%. In general, the greater the rehydrated silica to rubber ratio, the lower is the electrical resistance of a battery separator. At the greater silica ratios, the cured article is also less flexible.

Irradiation of the novel compositions is accomplished by an electron beam unit rated at 850 kw and 50 mA and available under the name of Dynamitron from Radiation Dynamics, Incorporated at Melville, New York. For purposes of the present invention, any electron beam unit capable of imparting a radiation level of 6 megarads is acceptable. Time of irradiation and power needed is a function of sheet or shape thickness. Hence, any reference herein to the irradiation level is to the same sheet or shape thickness.

In using a backing, it has been found that the open structure of a non-woven web is of an excessive "pore size" to be acceptable as a battery separator; however, the flexibility of a proper web to which a sheet of the microporous article can be securely attached could heretofore not have been utilized for want of a proper and flexible microporous sheet. Consequently, a flexible web and a fairly stiff brittle microporous sheet still had to be of considerable thickness and hence, are not used. With a flexible microporous article and a flexible backing, the combination of the two allow the use of a thinner sheet of the microporous article, which is very advantageous not only because it provides less resistance in a battery, but also the more flexible sheet is less apt to be punctured, will not fail in flexing, and the flexible web, for example, adds virtually no resistance to the combination when used in an electrolyte. At the same time, the backing can be safely irradiated, provides a sufficient "body" to the polymeric material and allows use of a polymeric material as thin as 5 to 8 mils. A thicker layer, for example, up to 25 mils, can still be used. Consequently, each use will dictate the appropriate thickness for the microporous layer with the backing material.

As a backing material, a polyester non-woven, heat-bonded (in distinction from an adhesive-bonded) web has been found to be especially desirable. An average fiber length in these webs is typically about 0.8 inches. These webs are available from duPont and Co. such as under the trademark Sontara 8000.

Properties of these webs are determined on basis of electrical resistance, tensile and tear strength. For battery separators, electrical resistance added as a result of the backing should be no greater than 1 m$\Omega$ in$^2$/mil of thickness. Tensile strength should be about 100 lb/in$^2$, elongation about 40%. Tear strength for a base web of 1.2 oz/yd, standard size should be measured by grab breaking strength (ASTM Method D-1682-64) and should be about 22 and up in machine direction and 13 and up in cross-direction. Generally, webs of a weight from 0.75 oz/yd (yard) to 2.2 oz/yd are available.

In the description herein, parts or percent are by weight, unless otherwise indicated.

In further illustrating the present invention, specific examples are furnished in the Tables below. These examples show the various properties and characteristics of the composition in the various forms thereof. The examples are not to limit the invention.

TABLE I

| THE EFFECT OF VARIOUS STABILIZERS | | | | |
|---|---|---|---|---|
| | Formulation | | | |
| | A | B | C | D |
| Natural Rubber, g | 80 | 80 | 80 | 80 |
| EPM, g | 20 | 20 | 20 | 20 |
| Rehydrated Silica, g | 360 | 360 | 360 | 360 |
| Moisture in Silica, % | 66.5 | 66.5 | 66.5 | 66.5 |
| TMPTM, g | 3.0 | 3.0 | 3.0 | 3.0 |
| Wingstay 29, g | — | 1.0 | — | — |
| Wingstay-L, g | 1.0 | — | 1.5 | 2.0 |
| Total Dose, MR | 4 | 4 | 4 | 4 |
| Dose Rate/pass, MR | 2 | 2 | 2 | 2 |
| Thickness, in. | 0.018 | 0.015 | 0.023 | 0.020 |
| Electrical Resistance, m$\Omega$ in.$^2$ | 56 | 50 | 72 | 60 |
| m$\Omega$ in.$^2$/mil | 3.1 | 3.3 | 3.1 | 3.0 |
| Weight Loss in Chromic Acid, % | 6.0 | 10.0 | 7.5 | 8.0 |
| Comments before subjecting separator to fluorescent light | ← | flexible | | → |
| Comments after subjecting separator to fluorescent light for 7 days | No crack within 7 days, but cheap crack after 2 weeks | Very cheap crack | Flexible after 2 weeks, cheap crack after folding many times | Very good. No cracks after 1 month |

TABLE II

| THE EFFECT OF EPM BLENDING WITH NATURAL RUBBER AND THE EFFECT OF VARIOUS TMPTM LEVELS | | | | | | | | |
|---|---|---|---|---|---|---|---|---|
| | E | F | G | H | I | J | K | I |
| Natural Rubber, g | 100 | 90 | 80 | 75 | 80 | 80 | 80 | — |
| EPM, g | — | 10 | 20 | 25 | 20 | 20 | 20 | 100 |
| Rehydrated Silica, g | 360 | 360 | 360 | 360 | 360 | 360 | 360 | 360 |
| Moisture in Silica, % | 66.5 | 66.5 | 66.5 | 66.5 | 66.5 | 66.5 | 66.5 | 61.9 |
| Dry Silica, g | — | — | — | — | — | — | — | 26 |
| TMPTM, g | 3 | 3 | 3 | 3 | 1.0 | 1.5 | 2.0 | 1.5 |
| Comments | ← | good mix | → | slight mixing | ← | Processed well | → | upside-down mix. Good |

TABLE II-continued
THE EFFECT OF EPM BLENDING WITH NATURAL RUBBER AND THE EFFECT OF VARIOUS TMPTM LEVELS

| | E | F | G | H | I | J | K | I |
|---|---|---|---|---|---|---|---|---|
| | | | | | problem | | | process. |
| 0 MR | | | | | | | | |
| Thickness, in. | 0.017 | 0.018 | 0.016 | 0.015 | 0.016 | 0.015 | 0.019 | 0.029 |
| Electrical Resistance, mΩ in.² | 54 | 54 | 48 | 57 | 50 | 47 | 57 | 58 |
| mΩ in.²/mil | 3.2 | 3.0 | 3.0 | 3.8 | 3.1 | 3.1 | 3.0 | 2.0 |
| Tensile Strength, psi | 142 | 150 | 215 | 250 | — | — | — | — |
| Elongation, % | 14 | 13 | 10 | 5 | — | — | — | — |
| Weight loss in Chromic Acid % | ← | ← | ← | Not Recoverable | | → | → | → |
| Comments | ← very flexible → | | flexible, slightly stiffer | Crack on one side | ← | flexible | → | stiff, long cracked when folded |
| 4 MR | | | | | | | | |
| Thickness, in. | 0.022 | 0.017 | 0.017 | 0.018 | 0.018 | 0.015 | 0.023 | 0.030 |
| Electrical Resistance, mΩ in.² | 55 | 50 | 46 | 60 | 50 | 40 | 60 | 60 |
| mΩ in.²/mil | 2.5 | 2.9 | 2.7 | 3.3 | 2.8 | 2.6 | 2.6 | 2.0 |
| Tensile Strength, psi | 146 | 152 | 220 | 245 | — | — | — | — |
| Elongation, % | 2 | 5 | 3 | 2 | — | — | — | — |
| Weight Loss in Chromic Acid, % | 50.0 | 35.0 | 8.0 | 8.0 | 30.0 | 6.0 | 8.0 | 2.0 |
| Comments | Very flexible & flimsy | ← flexible stiff → | | cracked on one side, stiff | ← | flexible | → | stiff, tough, cracked |

TABLE III
FORMULATIONS STUDIED AT VARIOUS SILICA REHYDRATION LEVELS AND RATIOS OF REHYDRATED SILICA/RUBBER

| | Formulation | | | | |
|---|---|---|---|---|---|
| | 1-A | 1-B | 1-C | 1-D | 1-E |
| Natural Rubber, g | 80 | 80 | 80 | 80 | 80 |
| EPM, g | 20 | 20 | 20 | 20 | 20 |
| Rehydrated Silica, g | 360 | 433 | 480 | 433 | 468 |
| Moisture of Rehydrated Silica, % | 66.5 | 66.5 | 66.5 | 69.0 | 69.0 |
| Wingstay-L, g | 2 | 2 | 2 | 2 | 2 |
| DPG, g | 2 | 2 | 2 | 2 | 2 |
| Carbon Black, g | 0.5 | 0.5 | 0.5 | 0.5 | 0.5 |
| TMPTM, g | 1.5 | 1.5 | 1.5 | 1.5 | 1.5 |
| Theoretical Moisture, % | 51.5 | 53.4 | 54.47 | 55.4 | 56.3 |
| Plasticity | — | 14 | 16 | 15 | 18 |
| Time in Banbury, min. | 8 | 8 | 8 | 8 | 8 |
| Drop Temperature of Banbury, °F. | 160–165 | 160–165 | 160–165 | 160–165 | 160–165 |
| Time on Mill (140° F.), min. | 7 | 7 | 7 | 7 | 7 |
| Temperature of Water Bath, °F. | 185 | 185 | 185 | 185 | 185 |
| Time in Water Bath, secs. | 40 | 40 | 40 | 40 | 40 |
| Temperature of Calendar, °F. | 130 | 130 | 130 | 130 | 130 |

TABLE IIIA
PHYSICAL AND ELECTRICAL PROPERTIES OF FORMULATIONS WITH VARIOUS SILICA REHYDRATION LEVELS AND RATIOS OF REHYDRATED SILICA/RUBBER

| | Formulations | | | | | | | | | |
|---|---|---|---|---|---|---|---|---|---|---|
| 0 MR | 1-A | 1-A(B)* | 1-B | 1-B(B) | 1-C | 1-C(B) | 1-D | 1-D(B) | 1-E | 1-E(B) |
| Thickness, in. | 0.016 | 0.025 | 0.016 | 0.022 | 0.015 | 0.021 | 0.015 | 0.023 | 0.018 | 0.021 |
| Electrical Resistance, mΩ in.² | 46 | 54 | 39 | 32 | 30 | 34 | 36 | 42 | 33 | 36 |
| mΩ in.²/mil | 2.9 | 2.2 | 2.4 | 1.5 | 2.0 | 1.6 | 2.4 | 1.8 | 1.8 | 1.7 |
| Tensile Strength, psi | 215 | 890 | 265 | 804 | 269 | 870 | 266 | 855 | 230 | 1030 |
| Elongation, % | 10.0 | 35.0 | 6.8 | 37.3 | 6.0 | 42.0 | 18.0 | 36.1 | 7.3 | 36.0 |
| Pounds to Break | — | — | 1.9 | 9.0 | 1.6 | 9.5 | 1.8 | 9.8 | 2.2 | 10.6 |
| Weight Loss in Chromic Acid, % | ← | ← | ← | ← | Not Recoverable | | → | → | → | → |
| Total Porosity, cc/g | — | — | 47 | 63 | 0.498 | 68 | 47 | 62 | 55 | 60 |
| Median Pore Diameter, μ | — | — | — | — | 0.059 | — | — | — | — | — |
| Moisture, % | 48.0 | — | 49.0 | — | 50.0 | — | 51.0 | — | 51.9 | — |
| Comments | very flexible | ← | ← | ← | ← | flexible | → | → | → | → |
| 4 MR | | | | | | | | | | |
| Thickness, in. | 0.017 | 0.025 | 0.015 | 0.021 | 0.015 | 0.017 | 0.015 | 0.020 | 0.020 | 0.021 |
| Electrical Resistance, mΩ in.² | 44 | 46 | 30 | 32 | 30 | 25 | 31 | 30 | 38 | 38 |
| mΩ in.²/mil | 2.6 | 1.8 | 2.0 | 1.5 | 2.0 | 1.5 | 2.1 | 1.5 | 1.9 | 1.8 |
| Tensile Strength, psi | 210 | 849 | 211 | 1190 | 247 | 1142 | 213 | 940 | 243 | 1022 |
| Elongation, % | 4.0 | 30.0 | 1.0 | 35.0 | 1.0 | 34.5 | 1.0 | 33.0 | 1.0 | 28.0 |
| Pounds to Break | — | — | 1.5 | 10.6 | 1.9 | 11.5 | 1.5 | 10.5 | 2.0 | 10.9 |
| Weight Loss Chromic Acid, % | 8.0 | 5.3 | 8.0 | 6.0 | 8.0 | 5.0 | 9.0 | 8.0 | BP** | 10.0 |
| Alcohol Porosity, % | — | — | 47.0 | 61.0 | 61.0 | 66.0 | 46.0 | 63.0 | 50.0 | 66.0 |
| Total Porosity, cc/g | — | — | 0.513 | 0.894 | 0.533 | — | 0.499 | — | 0.525 | — |

TABLE IIIA-continued
PHYSICAL AND ELECTRICAL PROPERTIES OF FORMULATIONS WITH VARIOUS SILICA REHYDRATION LEVELS AND RATIOS OF REHYDRATED SILICA/RUBBER

| | Formulations | | | | | | | | | |
|---|---|---|---|---|---|---|---|---|---|---|
| O MR | 1-A | 1-A(B)* | 1-B | 1-B(B) | 1-C | 1-C(B) | 1-D | 1-D(B) | 1-E | 1-E(B) |
| Median Pore Diameter, μ | — | — | 0.041 | 8.5 | 0.043 | — | 0.064 | — | 0.053 | — |
| Moisture, % | 48.0 | — | 48.0 | — | 48.0 | — | 51.0 | — | 53.0 | — |
| Comments | ← | ← | ← | ← | flexible and stiff | | → | → | → | |

(B)-Sontara Backed
BP-Broken Pieces

In following the general example above, a composition was prepared consisting essentially of natural rubber—254 grams, TMPTM—7.6 grams, Hi-Sil—472 grams, water—875 grams. A cured product obtained from the above composition had a resistance of 1.3 mΩ in²/mil and 33 mΩ in². The above illustrates the relative ratios of silica to rubber and the reduced resistance, but flexibility is also reduced.

Another composition was obtained by following the general example; the constituents of the same were as follows: 88.2 lbs. of 80% natural rubber; 15% EPCAR 306; 5% Phiolite S-6F (an 82.5% styrene, balance butadiene rubber (SBR) available from The Goodyear Tire & Rubber Co.); 139 lbs. Hi-Sil 233; 1.3 lbs. TMPTM; 1.7 lbs. DPG and 239.6 lbs. water. An electron beam cured article prepared from the above composition is suitable for forming various shapes or configurations of the cured material because the cured composition lends itself to ultrasonic welding. Accordingly, battery separators can be made as an envelope for a battery plate. It is to be understood that prior to curing, styrene-butadiene rubber and nitrile-butadiene rubber (NBR) are actually non-crosslinked, i.e., not thermoset polymers.

In the above described examples, weight loss in chromic acid is a typical gross test to establish unsaturation in the polymeric composition as well as useful life; an acceptable weight loss in less than 35%; it also typifies completion of curing and process efficiency with respect to crosslinking.

Similarly, shelf-life or storage stability of the cured microporous article is indicative of product life and is approximated by exposure to fluorescent light; typically, the composition should be good for at least 14 days before it develops cracks and loses flexibility.

The various measures to toughness of the unbacked, cured material are: tensile strength which should be in the range from 200 to 400 psi, preferably 300 to 400 psi. (For backed material, elongation in percent may be 20 to 90%, preferably 40 to 60%, and tensile strength up to 1200 psi.) Hence, it is now possible to produce very flexible shapes, i.e., conformable shapes when using thin sheets capable of great elongation; thicker sheets give tough, yet stiff products. Flexibility (non-brittleness) is easily measured by the 180° bend test and the present compositions easily meet this objective.

Again, while these values are generally pertinent to establish chemically desirable compositions, these values likewise can be used to establish the process variables vis-a-vis a standard.

A convenient measure of acceptable porosity is alcohol porosity and should be from 45 to 75%. Other measures of pososity have been given in the examples above and correspondingly, comparably acceptable values can be obtained from the above, first given value.

The electrical resistance norms for the battery separator are easily achieved; typically for the present microporous article, a resistance of 1.0 to 2.5 mΩ/mil is acceptable.

As mentioned before, dimensional stability of the shape during processing is outstanding and careful conduct of the process eliminates grinding of the end product. These advantages for the unbacked and backed material show the various advantages of the present invention.

In use in a battery, the battery separator is tested by conventional tests known in the art, e.g., a "cold cranking" test and "J-240" test identified by SAE testing procedures.

When employing a web, the thickness of the battery separator may be as little as 5 to 8 mils although typically a thickness of the separator is about 12 to 20 mils (backed) and from 10 to 20 mils without backing. Again, in a battery separator, the effectiveness of the thinner polymeric material on the web in combination is measured by the above two tests which also characterize the results of the process.

What is claimed is:

1. As an article of manufacture, a microporous, flexible shape of a sulfur-free, cured polymeric material selected from the group consisting of natural rubber, ethylenepropylene rubber, polyisoprene, styrene butadiene, nitrile-butadiene, and mixtures thereof, and a polyol acrylate, methacrylate, or mixtures thereof, as precursor curative, of a pore size less than 2 microns and of a predetermined flexibility.

2. As an article of manufacture, a microporous, flexible shape of a sulfur-free, cured polymeric material selected from the group consisting of curable rubber, ethylene-propylene rubber, polyisoprene, styrene-butadiene, nitrile-butadiene, or mixtures thereof, and a polyol acrylate, methacrylate of at least two acrylate or methacrylate groups, or mixtures thereof, as precursor curative, of a pore size less than 2 microns and of a predetermined flexibility wherein said article has a backing material of an inert, nonwoven heat-bonded fibrous polymer, said backing material having a shelf-life resistance to an electrolyte for electrical storage batteries of at least equivalent to said microporous article.

3. The article as defined in claim 1, wherein the polymeric microporous article is a sulfur-free, cross-linked composition of natural rubber.

4. The article as defined in claim 1, wherein the polymeric microporous article is a sulfur-free, cross-linked composition of natural rubber, ethylene-propylene rubber, or mixtures thereof.

5. The article as defined in claim 1, wherein said material is cross-linked styrene-butadiene rubber, nitrile-butadiene rubber, a polyisoprene or mixtures of same.

6. The article as defined in claim 2, wherein said material is cross-linked styrene-butadiene rubber, nitrile-butadiene rubber, a polyisoprene or mixtures of same.

7. The article of manufacture as defined in claim 1, wherein the microporous polymeric article a sulfur-free, cross-linked polymeric material of natural rubber, and ethylene-propylene rubber of 95 to 75% natural rubber to 5 to 25% ethylene-propylene rubber.

8. The article of manufacture as defined in claim 1, wherein the microporous polymeric article is a sulfur-free, cross-linked polymeric material of natural rubber and ethylene-propylene rubber in percent by weight of natural rubber to ethylene-propylene rubber of 80% natural rubber to 20% ethylene-propylene rubber.

9. The article of manufacture as defined in claim 2, wherein the microporous polymeric article is a sulfur-free, cross-linked polymeric material of natural rubber, or ethylene-propylene polymer rubber or mixtures of same.

10. The article of manufacture as defined in claim 2, wherein the microporous polymeric article is a sulfur-free, cross-linked polymeric material of natural rubber and ethylene-propylene rubber in percent by weight of natural rubber to ethylene-propylene rubber from 95 to 75% natural rubber to 5 to 25% ethylene propylene rubber.

11. The article of manufacture as defined in claim 1, wherein the same contains an ultraviolet light stabilizer.

12. The article of manufacture as defined in claim 1, wherein the microporous polymeric material has a pore size of less than 1 micron.

13. The article of manufacture as defined in claim 1, wherein the microporous polymeric material contains carbon black.

14. The article of manufacture as defined in claim 1, wherein a curative for said polymeric material is a polyol diacrylate, a polyol triacrylate, a polyol tetracrylate, a polyol dimethacrylate, a polyol trimethacrylate, a polyol tetramethacrylate, or mixtures of same.

15. The article of manufacture as defined in claim 14, wherein the polyol is a trimethylol propane, pentaerythritol, triethylene glycol or 1,6-hexane diol.

16. The article of manufacture as defined in claim 14, wherein the polyol is a trimethylol propane.

17. The article of manufacture as defined in claim 2, wherein a curative for said polymeric material is a polyol diacrylate, a polyol triacrylate, a polyol tetracrylate, a polyol dimethacrylate, a polyol trimethacrylate, a polyol tetramethacrylate, or mixtures of same.

18. The article of manufacture as defined in claim 17, wherein the polyol is a trimethylol propane, pentaerythritol, triethylene glycol, or 1-6-hexane diol.

19. The article of manufacture as defined in claim 17, wherein the polyol is trimethylol propane.

20. As an article of manufacture, a battery separator for an electric storage battery of a microporous, cured, flexible sulfur free polymeric material of a natural rubber, an ethylene-propylene rubber or polyisoprene, styrene-butadiene, nitrile-butadiene and mixtures of same having a 180° bend flexibility, and a pore size of less than 1 micron.

21. The battery separator as defined in claim 20, wherein the same is of a cured polymeric material of natural rubber and ethylene-propylene rubber.

22. The battery separator as defined in claim 20, wherein the same is of a cured polymeric material of natural rubber, ethylene-propylene copolymer, styrene-butadiene rubber or mixtures of same.

23. The battery separator as defined in claim 20, wherein the polymeric material is of a cured natural rubber and an ethylene-propylene rubber mixture in weight percent ranging from 75 to 95% natural rubber.

24. The battery separator as defined in claim 20, wherein the polymeric material is 80% by weight natural rubber, 20% by weight of rubbery ethylene-propylene copolymer of about 60% ethylene monomer in said copolymer by weight.

25. The battery separator as defined in claim 20, wherein the microporous polymeric material further contains carbon black.

26. The battery separator as defined in claim 20, wherein the microporous polymeric material further contains a UV light stabilizer.

27. As an article of manufacture, a flexible, microporous battery separator of a sulfur-free, cured polymeric material of a pore size of less than 1 micron, a 180° bend test flexibility, and an electrical resistance in an electrolyte solution for an electric storage battery of less than 3.5 m$\Omega$ in.$^2$/mil.

28. The article of manufacture as defined in claim 20, wherein the same has a backing of a polymer fibrous material of heat-bondable fibers having at least an equivalent resistance to an electrolyte for an electric storage battery to said polymer material.

29. The article of manufacture as defined in claim 27, wherein the backing material is a non-woven, fibrous polymeric material of a polyester.

30. A curable, sulfur-free rubber composition for microporous shapes comprising as a curable material, a curable natural rubber, ethylene-propylene rubber, or mixtures of same, and, as a curative therefor, a methacrylate or acrylate of a polyol, and rehydrated silica of 50 to 70% hydration as a micropore former therefor.

31. The curable rubber composition as defined in claim 30, wherein the same comprises 80% by weight natural rubber, 20% by weight ethylene-propylene rubber having 60% by weight of ethylene as copolymer thereof, as a curative therefor trimethylolpropane trimethacrylate and rehydrated silica of a 60 to 70% hydration, carbon black and a stabilizer therefor, said curable composition being curable via electron beam irradiation at less than 6 megarads.

32. The curable rubber composition as defined in claim 30, wherein the same comprises 80% by weight natural rubber, 15% by weight ethylene-propylene rubber, and 5% by weight styrene-butadiene rubber, as a curative therefor trimethylolpropane trimethacrylate and rehydrated silica of a 60 to 70% hydration, carbon black and a stabilizer therefor, said curable rubber composition being curable via electron beam irradiation at less than 6 megarads.

* * * * *

UNITED STATES PATENT AND TRADEMARK OFFICE
CERTIFICATE OF CORRECTION

PATENT NO. : 4,226,926
DATED : October 7, 1980
INVENTOR(S) : Bruce S. Goldberg and Mahendra Shah It is certified that error appears in the above-identified patent and that said Letters Patent are hereby corrected as shown below:

Table II, column H, after "slight mixing" insert --problem--.

Column 11, line 24, delete "Phiolite" and insert --Pliolite--.

Column 13, line 4, before "a" insert --is--.

Column 13, line 17 delete "polymer".

Signed and Sealed this

Seventeenth Day of February 1981

[SEAL]

Attest:

Attesting Officer

RENE D. TEGTMEYER

Acting Commissioner of Patents and Trademarks